W. E. GLOVER.
ANTISKIDDING DEVICE.
APPLICATION FILED JULY 12, 1918.
1,350,966. Patented Aug. 24, 1920.
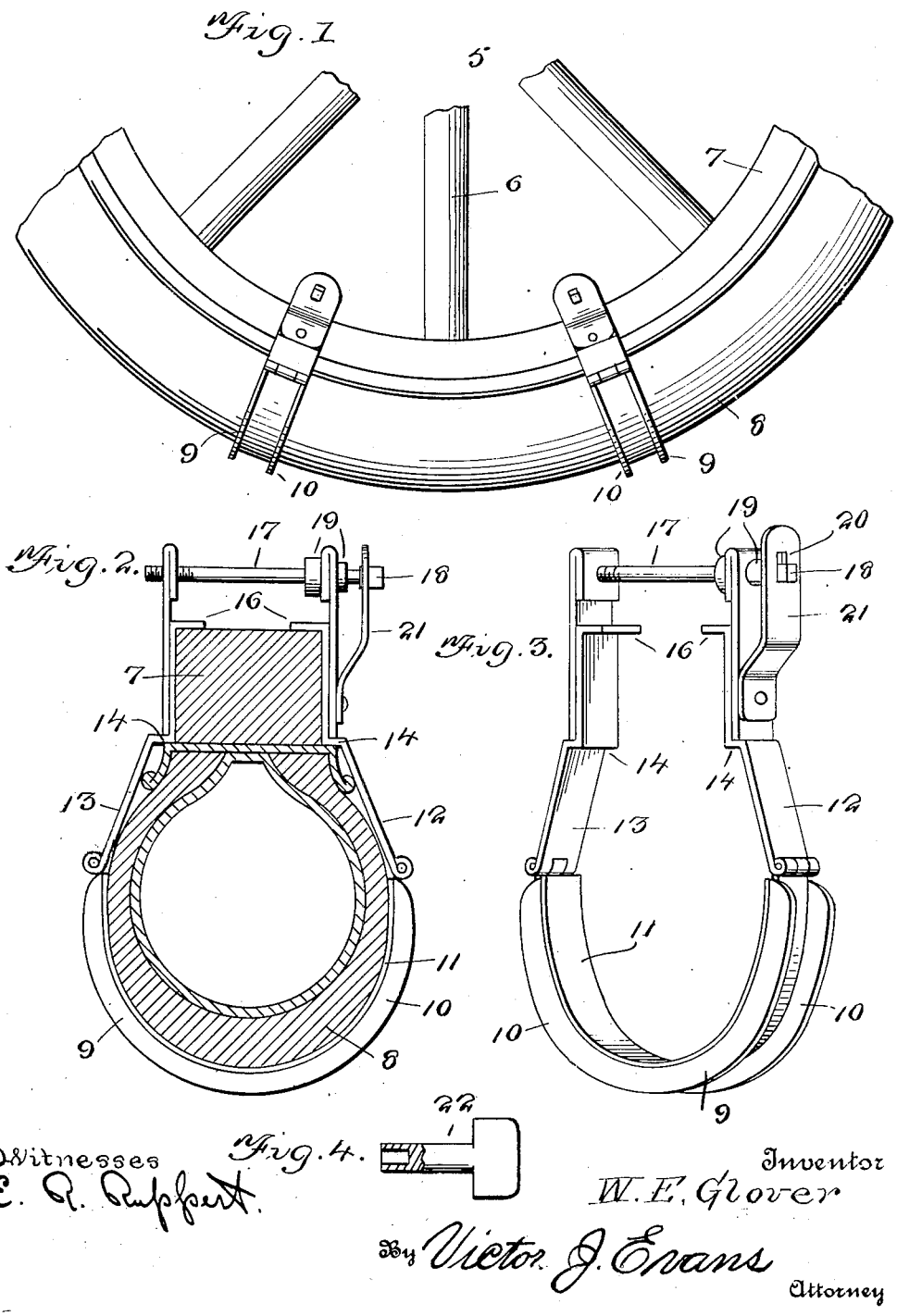

UNITED STATES PATENT OFFICE.

WILLIAM E. GLOVER, OF COIN, IOWA.

ANTISKIDDING DEVICE.

1,350,966.   Specification of Letters Patent.   Patented Aug. 24, 1920.

Application filed July 12, 1918. Serial No. 244,602.

*To all whom it may concern:*

Be it known that I, WILLIAM E. GLOVER, a citizen of the United States, residing at Coin, in the county of Page and State of Iowa, have invented new and useful Improvements in Antiskidding Devices, of which the following is a specification.

This invention has reference to an antiskidding device for pneumatic tires.

The object of the invention is to arrange upon a wheel a plurality of tread members having means whereby the same may be easily, quickly and securely retained on said wheel.

It is a further object of the invention to produce a non-skidding device for wheels comprising a plurality of substantially U-shaped tread members having their edges formed with outwardly disposed flanges which serve as calks and their ends provided with hinged plates adapted to be arranged upon the opposite sides of the wheel rim, and having means for gripping said rim, adjustable means being provided for retaining the plates in rim engaging position, and means being also provided for holding said adjusting means against accidental movement.

Further objects and advantages will present themselves as the nature of the invention is better understood, reference being had to the accompanying drawings, in which:

Figure 1 is a side elevation of a portion of a vehicle wheel provided with the improvement;

Fig. 2 is a greatly enlarged sectional view through the tire taken in advance of one of the anti-skidding devices;

Fig. 3 is a perspective view of the improvement.

Fig. 4 is a plan view of the key employed, parts being broken away and parts being in section.

Referring now to the drawings in detail, the numeral 5 designates a portion of a vehicle wheel having the usual spokes 6 connected at their outer ends with a rim or felly 7, and upon which rim is secured, in the usual manner, a pneumatic tire 8. Any desired number of tread members may be employed on the wheel, but preferably, and as disclosed by the drawings, one of such members is arranged between each pair of spokes.

The tread members are each indicated by the numeral 9. Each of the tread members is substantially U-shaped in cross section and has its edges provided with outturned flanges 10. These flanges form each of the treads with a pair of spaced calks. The U-shaped tread members 9 are of a size to snugly receive the pneumatic tire 8, and upon the inner straight face of each of said members is a strip of cushioning material 11. To the opposite ends of each of the tread members is hingedly secured a plate designated by the numerals 12 and 13 respectively. Each of the plates is provided with an inbent portion forming a shoulder 14 that is adapted to engage with the inner surface of the tire carrying rim 15 that is secured upon the felly 7. The plates are continued in parallelism from the inturned portions or shoulder 14 and are formed with flanges 16 that are designed to overlie the inner edge of the felly 7. The portions of the plate extending beyond the flanges have oppositely disposed parallel openings one edge being threaded, and these openings receive a threaded adjusting element in the nature of a bolt 17. The bolt, of course, coengages with the threads in one of the openings of the plate, the said bolt having one of its ends non-threaded and square, as indicated by the numeral 18. This square portion provides the head of the bolt, and the said bolt, inward of the said head has inner and outer collars or flanges 19 respectively contacting with the opposite faces of the plate provided with the non-threaded opening. The head 18 is received in a rectangular opening 20 provided adjacent the outer end of a flat spring 21, the inner end of the said spring being secured to one of the plates 12 or 13. A suitable key 22 is provided. This key has its shank formed with a square socket designed to receive the head 18 of the bolt 17 and the end of the key is also designed to be forced against the spring to bring the same inwardly toward one of the plates and to bring the opening therein away from the square headed portion of the bolt to permit of the turning of the bolt either when the device is being applied to the wheel or being detached therefrom. When the spring is relieved of the pressure of the key it will immediately resume its normal position and the square opening therein contacting with the opposite sides of the square head 18 will hold the said head against turning.

While I have illustrated and described the preferred embodiment of the improvement as it now appears to me, the nature of the invention is such that the same is necessarily susceptible to modifications, all of which, however, being recited in what is claimed.

Having thus described the invention, what is claimed as new is:—

In a device for the purpose set forth, a headed bolt, a member through which the bolt passes and on which the bolt is revoluble, spaced flanges on the bolt contacting with the opposite faces of the member for sustaining the head of the bolt away from the said member, locking means for the bolt, comprising a slotted spring having an offset end which is secured to the member, the head of the bolt designed to be received in the slot of the spring and the latter being susceptible to a movement in the direction of the member to bring the same out of engagement with the head of the bolt and to permit of the turning of the bolt on the member.

In testimony whereof I affix my signature.

WILLIAM E. GLOVER.